June 17, 1924.
R. H. HASSLER
SHOCK ABSORBER
Filed June 9, 1922
1,497,850
2 Sheets-Sheet 2
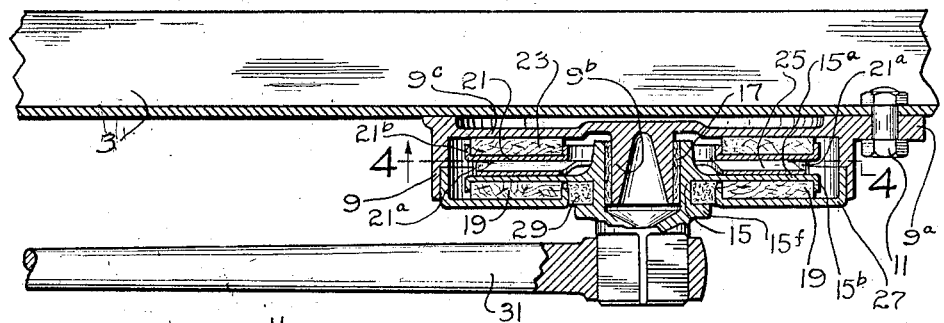
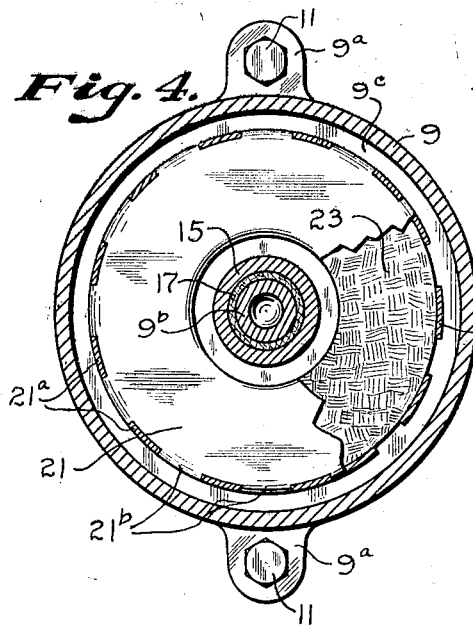
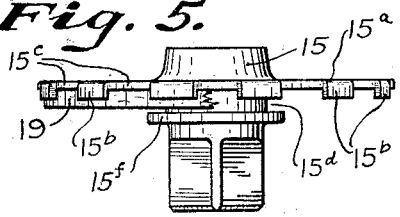
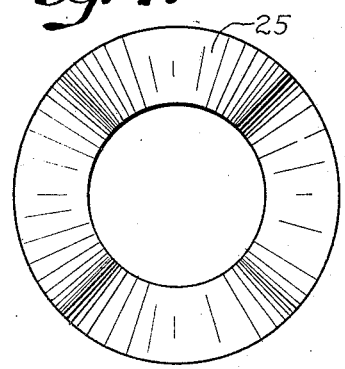
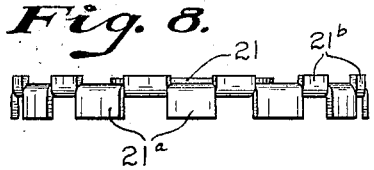
INVENTOR
Robert H. Hassler,
BY Raymond F. Buckley,
ATTORNEY Patented June 17, 1924.

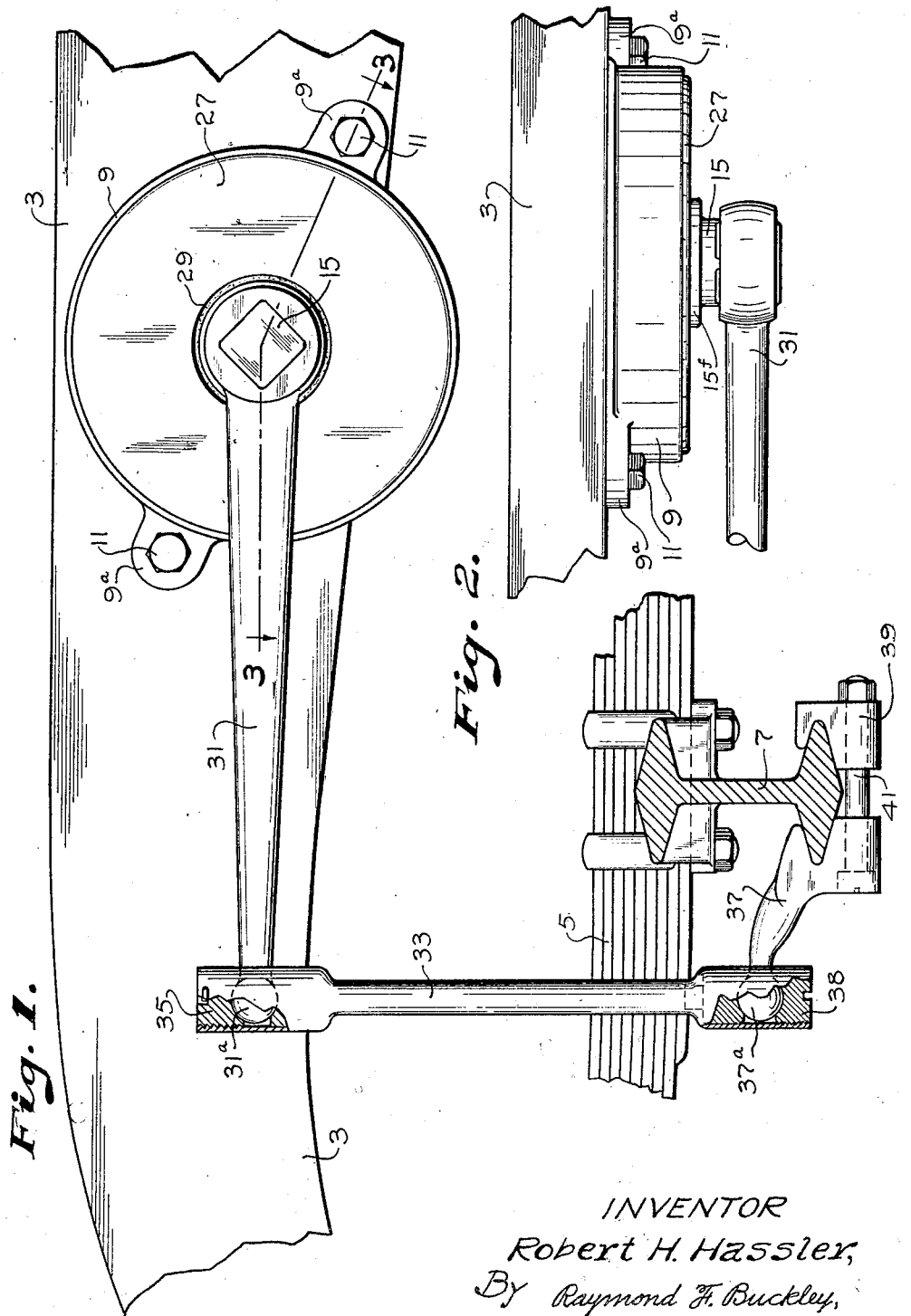

1,497,850

UNITED STATES PATENT OFFICE.

ROBERT H. HASSLER, OF INDIANAPOLIS, INDIANA.

SHOCK ABSORBER.

Application filed June 9, 1922. Serial No. 567,093.

*To all whom it may concern:*

Be it known that I, ROBERT H. HASSLER, a citizen of the United States, residing at Indianapolis, in the county of Marion and State of Indiana, have invented certain new and useful Improvements in Shock Absorbers, of which the following is a specification.

This application is a continuation in part of my earlier co-pending application filed May 25, 1922, Serial No. 563,538.

My invention relates to that class of shock absorbing devices in which friction is employed to restrain and dampen the natural oscillatory movements of vehicle springs, and the objects of the present invention are similar to those embodied in the above described co-pending application, with modified features that will afford the same advantages under different conditions of use.

The principal object of the invention is to provide simple and practical improvements in friction shock absorbers whereby high efficiency is attained, construction is simplified, and unusual compactness of design is secured without a multiplicity of parts to wear loose and rattle.

Another purpose of my invention is to provide an enclosed construction whereby all forms of road dirt and other foreign matter are effectually excluded from the internal parts of the device.

A still further object of the invention consists in the provision of means for setting up and maintaining a predetermined friction pressure between the moving parts of the device, this pressure being properly adjusted when the device is assembled.

The enclosed construction is of a "fool proof" nature and prevents any tampering with the correct predetermined friction pressure.

Still another advantage lies in the fact that the heat incident to the friction is generated in a manner to be most readily and efficiently dissipated. With other forms of friction shock absorbers the parts operate in such a manner that some or all of the heat is generated on the inner surfaces where the parts are more or less inaccessible to air cooling. In the present device, however, provision is made so that the heat generated by the friction will be immediately inside the outer walls where it is most readily dissipated.

I will now proceed to describe my invention with reference to the accompanying drawings, and there point out more particularly the essential features thereof in the annexed claims.

In the drawings Figure 1 is a side elevation of my improved friction shock absorber, shown as occupying operative position on a fragment of a vehicle chassis. Fig. 2 is a fragmentary plan view of the friction device shown mounted on the frame of a vehicle chassis. Fig. 3 is a horizontal section of the device on the line 3—3 in Fig. 1. Fig. 4 is a vertical section of the friction body taken on the line 4—4 in Fig. 3, illustrating some of the internal working parts. Fig. 5 is an elevation of the center oscillating hub member, showing a fragment of the friction disk secured therein. Fig. 6 is an elevation of the compression spring, and Fig. 7 is a plan view thereof. Fig. 8 is an elevation of the inner friction disk container.

Referring now to the drawings in detail, 3 designates a portion of the frame of a vehicle chassis, 5 a portion of the spring which supports the frame, and 7 designates a cross section of the axle which supports both the spring and frame.

The shock absorber body 9 consists of a hollow cylindrical housing with ears $9^a$ projecting therefrom, by which it is securely attached to the frame 3 by the bolts 11. The body 9 is further provided with a centrally located shaft or pivot bearing $9^b$, projecting from the integral closed end $9^c$ of body 9, upon which is mounted a hub member 15. 17 is a cylindrical bush pressed into the central hollow portion of the hub member 15, forming a journal or bearing. The hub member 15 is provided with a flanged portion $15^a$, from the periphery of which project a plurality of out-turned lips or keys $15^b$, forming a cup shape disk container; the spaces between these lips form a plurality of grooves $15^c$. This hub member also contains at the base of the flange an annular recess or groove $15^d$, which is formed by the circular flange portion $15^f$. Into disk container $15^a$ is pressed and securely held the friction disk 19, and is held non-rotatable in relation to its container into which it is pressed. 21 is a second disk container or flange, containing on its periphery a plurality of lips or keys $21^a$ and $21^b$ similar to those described on container $15^a$, and is mounted in and arranged adjacent to the inner annular surface of the body 9. The keys 21ª of container 21, fit loosely into the spaces 15ᶜ of container 15, so that the container 21 and container 15ª can move axially with relation to one another, but are locked circumferentially with relation to one another. 23 is a second friction disk securely pressed into container 21, and held so as to be non-rotatable in relation to container 21, by the lips 21ᵇ, and is mounted in the shock absorber body 9 to frictionally engage the flat inside annular surface therein. Interposed between container 15ª and 21, is an annular spring 25 in a condition of compression, tending to press the two containers in an axial direction away from one another. 27 is a hollow cup-shaped cover securely held in the shock absorber body 9 by being tightly pressed therein. 29 is an annular felt washer lying in the groove 15ᵈ of the hub member 15, this groove being formed between the base of the disk container 15ª and the small hub flange 15ᶠ.

The outer end of hub member 15 terminates in a square shank, affording means for pressing tightly thereon an actuator lever or arm 31, the free end of which can be attached in any suitable manner to the axle element 7 to respond to the vibrations of the axle and frame elements, which result from road inequalities. For the purpose of illustration I have shown a tubular connecting rod 33 flexibly connected to the free end of arm 31, by means of the ball 31ª and the adjusting plug 35. The lower end of the connecting rod 33, similarly to its upper end, is arranged to be flexibly attached to the axle bracket 37 by means of the ball 37ª, and the adjusting plug 38, the bracket being securely clamped to the axle 7 by the employment of the clamp 39 and the clamp bolt 41.

The operation of the parts is similar to that described in my co-pending application filed May 25, 1922, Serial No. 563,538, and will be further described as follows: Spring 25 sets up a central internal pressure transmitted through the containers 21 and 15ª, to the friction disks 19 and 23 respectively, and thus sets up a frictional resistance or damping effect to oscillations of the frame or axle elements. The friction disks 19 and 23 cannot slide in their containers, but are forced to slide upon the inner surfaces of the outer casing only. The result of this is, that heat is generated only in the outer walls of the device, and there is no heat generated internally. This concentration of heat in the outer walls, where it is most susceptible of dissipation by air cooling, is a great advantage as it helps materially to keep down the temperature of the device when it is worked hard. When the disks 19 and 23 are assembled in their respective containers, and operatively mounted in the body 9 with the cover 27 in place, the disks are almost completely enclosed, with the exception of the space between the inside diameter of cover 27 and the outside diameter of the hub member 15. This space is filled by the supporting hub member 15 with its hub flange 15ᶠ and felt washer 29. By making the flange 15ᶠ almost as large in diameter as the inner diameter of cover 27, the larger portion of the felt washer is protected from mechanical damage and is inaccessible to road dirt, water and other foreign matter, except through the small opening left between the outside of flange 15ᶠ and the inside of cover 27. The fact that this one opening or circular joint is of small diameter in relation to the larger diameters of the device, becomes a big advantage as compared to any construction where the crevice or joint is of large diameter, as the surface movements of the wearing parts are decreased proportionately, thus decreasing the amount of wear.

It is obvious that many modifications and changes may be made in my invention without departing from the spirit thereof, and I do not mean to limit myself to the exact construction shown and described.

What I claim and desire to secure by Letters Patent is—

A shock absorber, having, in combination, an oscillating hub member responsive to the throw of the car body under road inequalities; a non-rotating housing therefor provided with bearings for the oscillating member, a pair of friction disks arranged adjacent to and parallel with one another, said hub member containing a hub flange, a second flange in locking engagement with said hub flange, said pair of disks mounted on the hub member through the medium of the said two flanges, a cover for enclosing said friction disks, interposed spring means for frictionally engaging said disks, and actuator means for operating said shock absorber.

In witness whereof, I have hereunto set my hand and seal at Indianapolis, Indiana, this 7th day of June, A. D., one thousand nine hundred and twenty-two.

ROBERT H. HASSLER. [L. S.]